Figure 1:
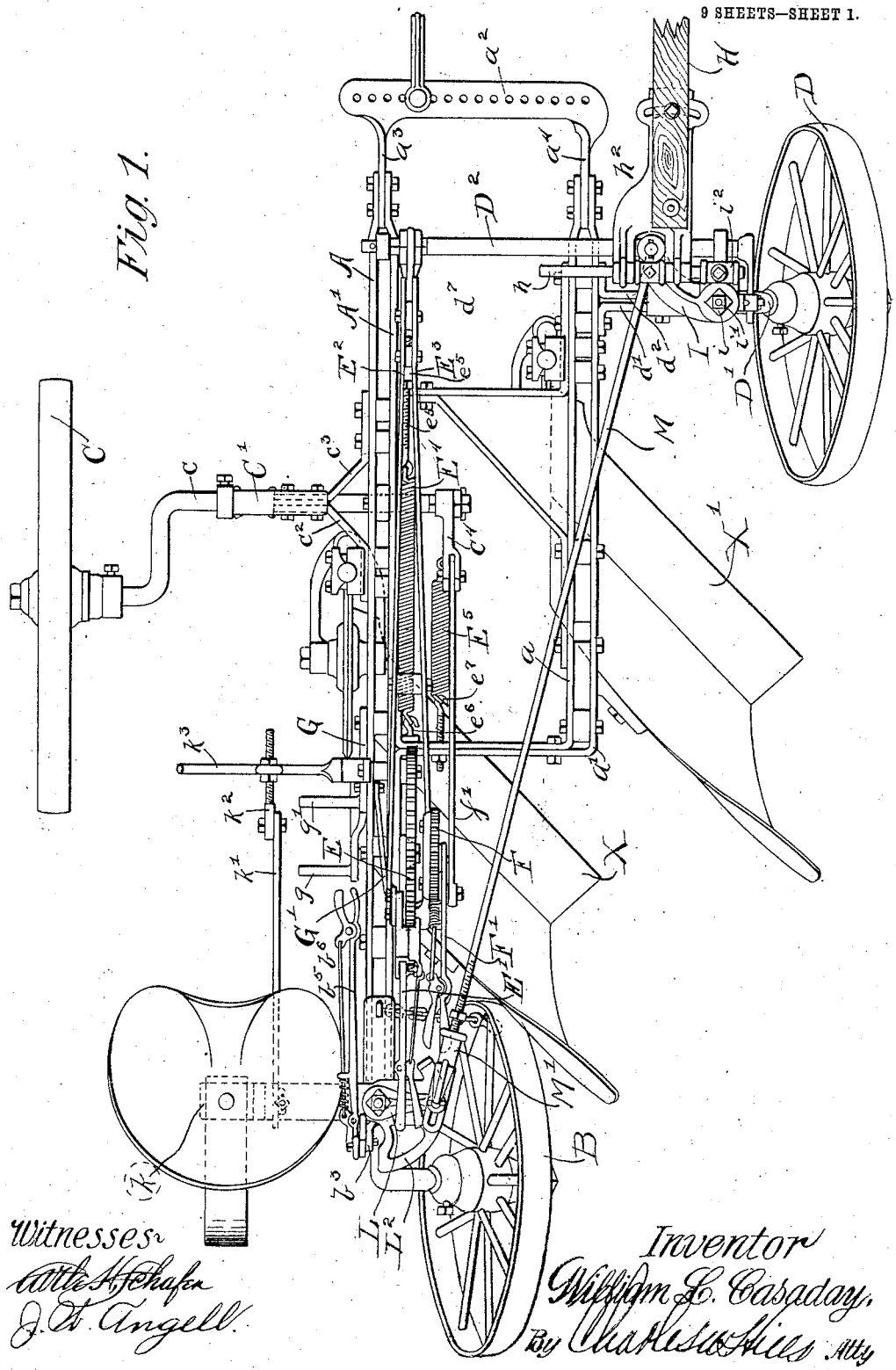

No. 846,184. PATENTED MAR. 5, 1907.
W. L. CASADAY.
RIDING PLOW.
APPLICATION FILED JULY 23, 1904.

9 SHEETS—SHEET 2.

Witnesses

Inventor
William L. Casaday
By

No. 846,184. PATENTED MAR. 5, 1907.
W. L. CASADAY.
RIDING PLOW.
APPLICATION FILED JULY 23, 1904.

9 SHEETS—SHEET 3.

Witnesses

Inventor
William L. Casaday.
By ........ Atty.

No. 846,184. PATENTED MAR. 5, 1907.
W. L. CASADAY.
RIDING PLOW.
APPLICATION FILED JULY 23, 1904.
9 SHEETS—SHEET 4.
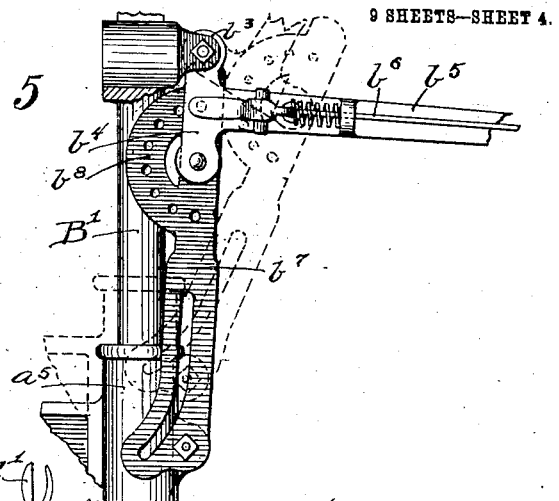
Fig. 5
Fig. 4.
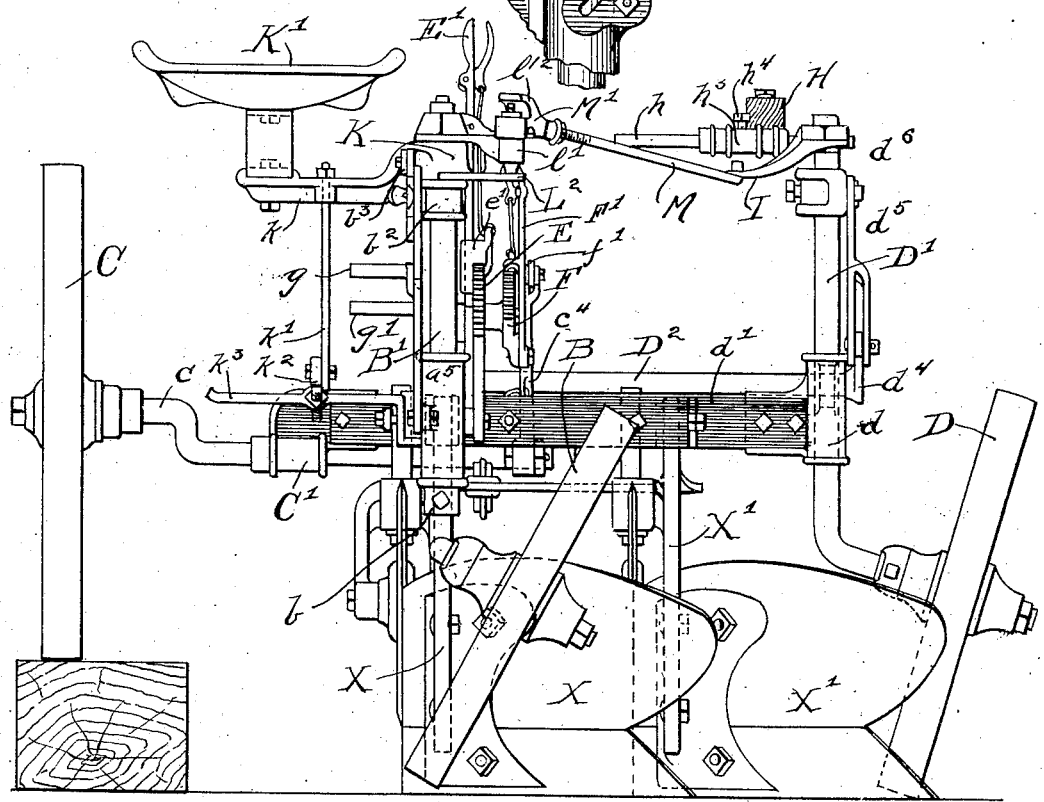
Witnesses
Carl H. Schafer
J. F. Angell
Inventor
William L. Casaday,
By Charles W. Hill, Atty No. 846,184. PATENTED MAR. 5, 1907.
W. L. CASADAY.
RIDING PLOW.
APPLICATION FILED JULY 23, 1904.

9 SHEETS—SHEET 5.

Witnesses
Inventor
William L. Casaday.
By ................ Atty

No. 846,184. PATENTED MAR. 5, 1907.
W. L. CASADAY.
RIDING PLOW.
APPLICATION FILED JULY 23, 1904.
9 SHEETS—SHEET 6.
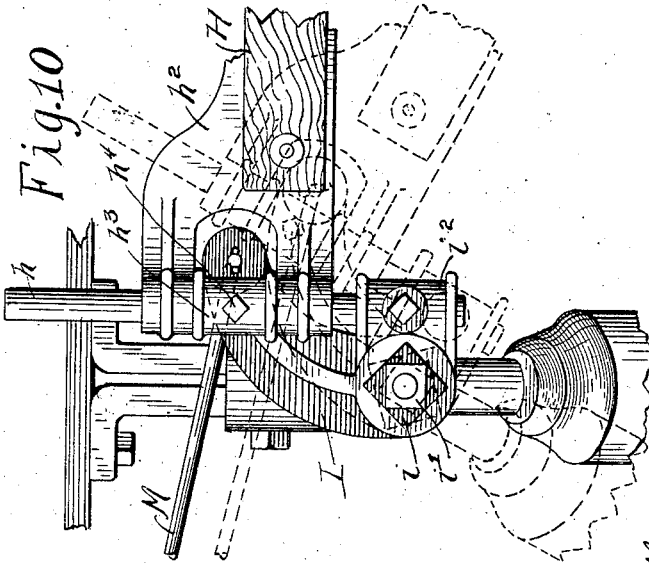
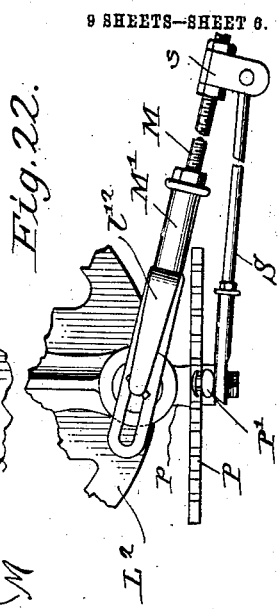
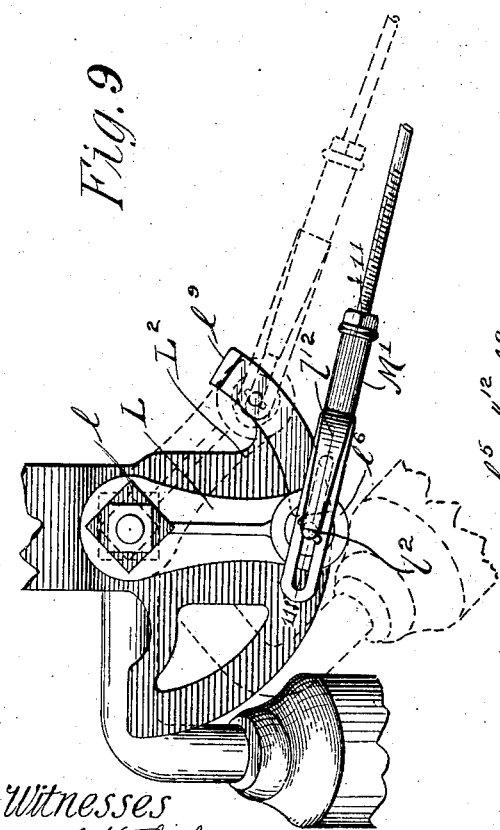
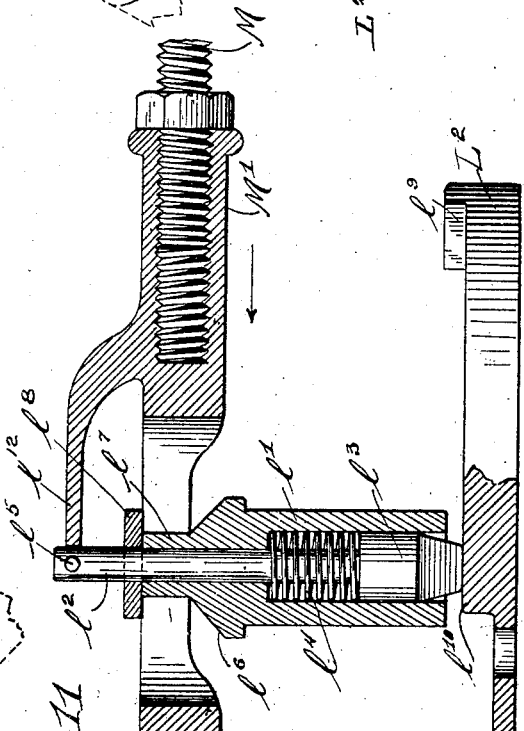
Witnesses
Inventor
William L. Casaday.
By ____ Atty.
THE NORRIS PETERS CO., WASHINGTON, D. C.

No. 846,184. PATENTED MAR. 5, 1907.
W. L. CASADAY.
RIDING PLOW.
APPLICATION FILED JULY 23, 1904.
9 SHEETS—SHEET 7.
*Fig. 12*
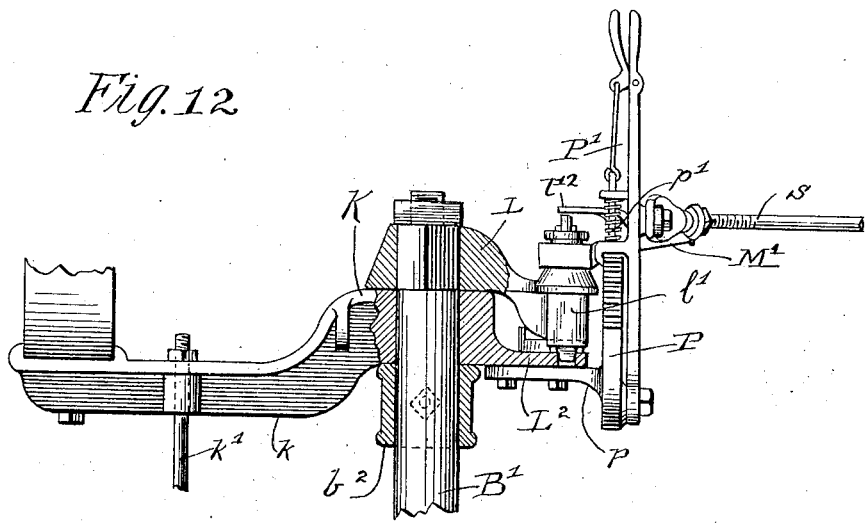
*Fig. 14*
*Fig. 13*
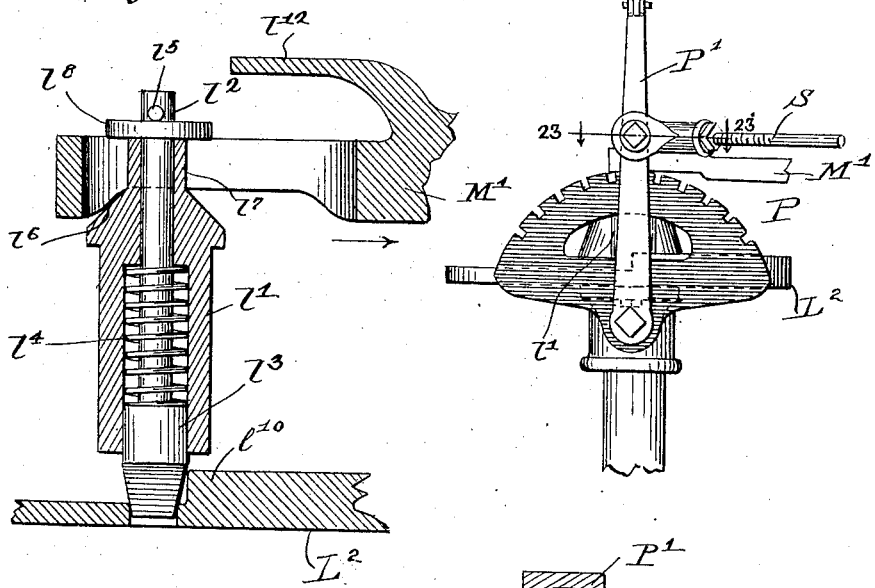
*Fig. 23.*
Witnesses
Inventor
William L. Casaday,
By Charles ___, Atty.

No. 846,184. PATENTED MAR. 5, 1907.
W. L. CASADAY.
RIDING PLOW.
APPLICATION FILED JULY 23, 1904.

9 SHEETS—SHEET 8.

Witnesses

Inventor
William L. Casaday.
By Charles W. Rice, Atty

No. 846,184. PATENTED MAR. 5, 1907.
W. L. CASADAY.
RIDING PLOW.
APPLICATION FILED JULY 23, 1904.
9 SHEETS—SHEET 9.
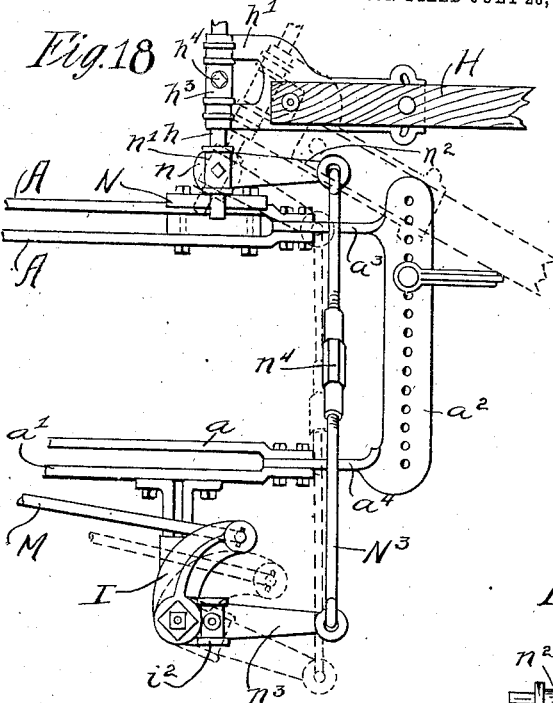
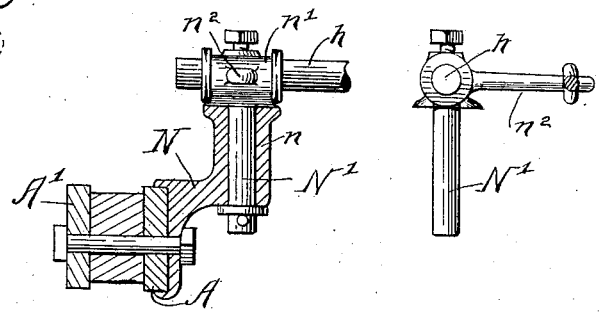
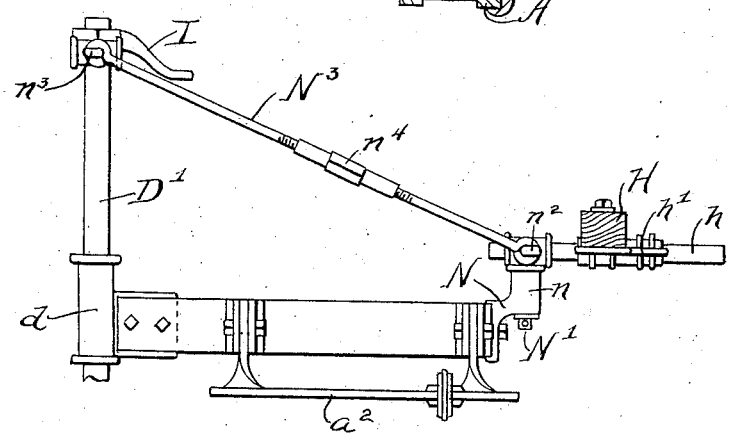
Witnesses
Inventor
William L. Casaday.
By Charles ___ Atty

UNITED STATES PATENT OFFICE.

WILLIAM L. CASADAY, OF SOUTH BEND, INDIANA.

RIDING-PLOW.

No. 846,184.      Specification of Letters Patent.      Patented March 5, 1907.

Application filed July 23, 1904. Serial No. 217,754.

*To all whom it may concern:*

Be it known that I, WILLIAM L. CASADAY, a citizen of the United States, and a resident of the city of South Bend, county of St. Joseph, and State of Indiana, have invented certain new and useful Improvements in Riding-Plows; and I do hereby declare that the following is a full, clear, and exact description of the same, reference being had to the accompanying drawings, and to the letters of reference marked thereon, which form a part of this specification.

This invention relates to improvements in riding-plows and is shown embodied as in a riding gang-plow.

Heretofore such plows have been so constructed that in order to lift the plow bottoms and beams without lifting the plowman it has been necessary to make a frame supported on the wheels to carry the beams and plow-bottom as well as the operator.

The object of this invention is to provide a strong and durable construction in which the frame that heretofore has carried the plow beams and bottoms and also the weight of the operator is dispensed with.

It is also an object of this invention to provide a construction whereby in turning a positive connection is afforded between the front and rear furrow-wheels, causing each to cramp simultaneously, thus making the turn easier and quicker.

It is also an object to simplify the construction of riding and gang plows generally and to afford a construction simple, strong, and durable and of light weight.

The invention embraces many novel features, and consists in the matters hereinafter described, and more fully pointed out and defined in the appended claims.

Figure 2:
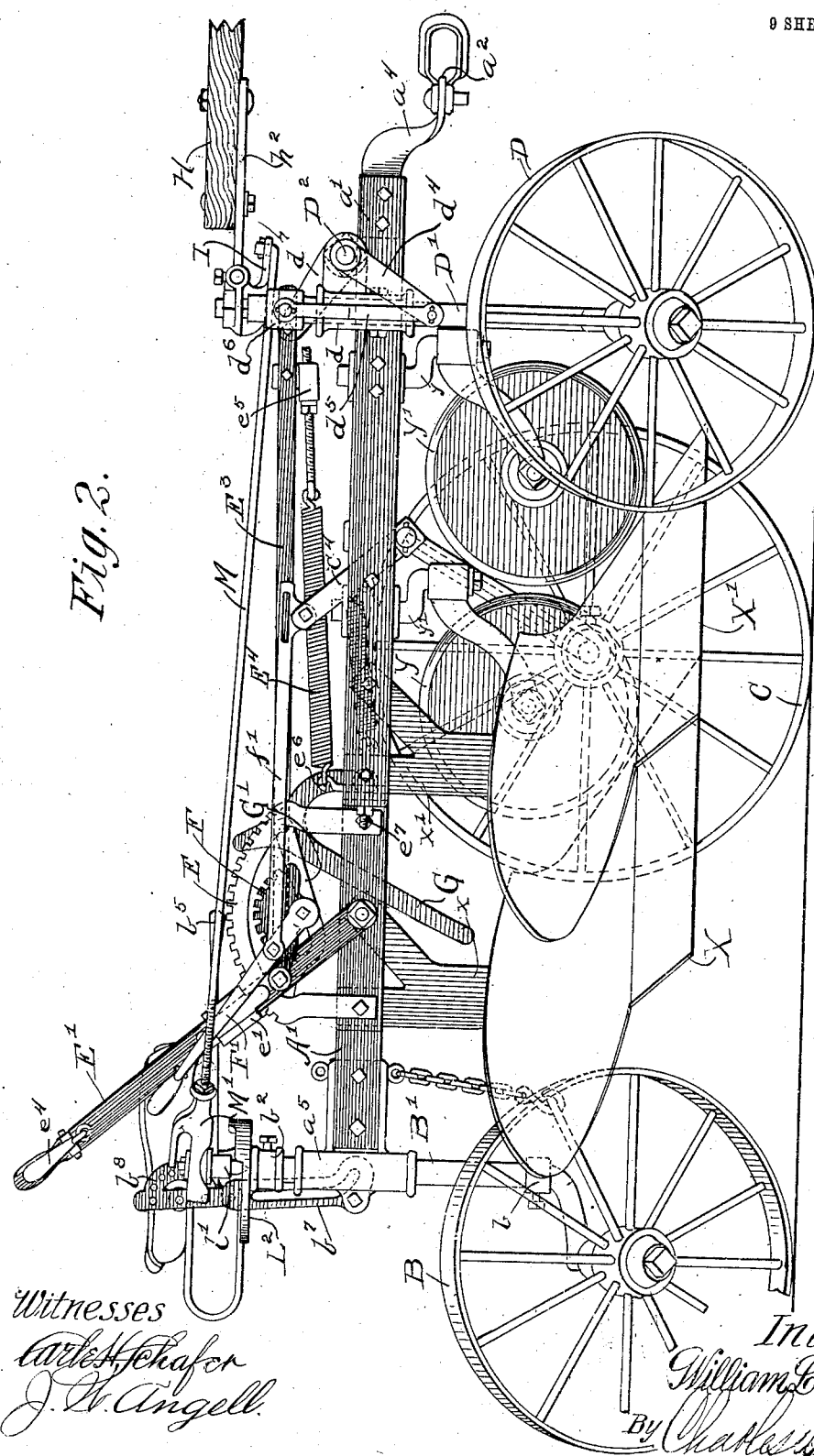
Figure 3:
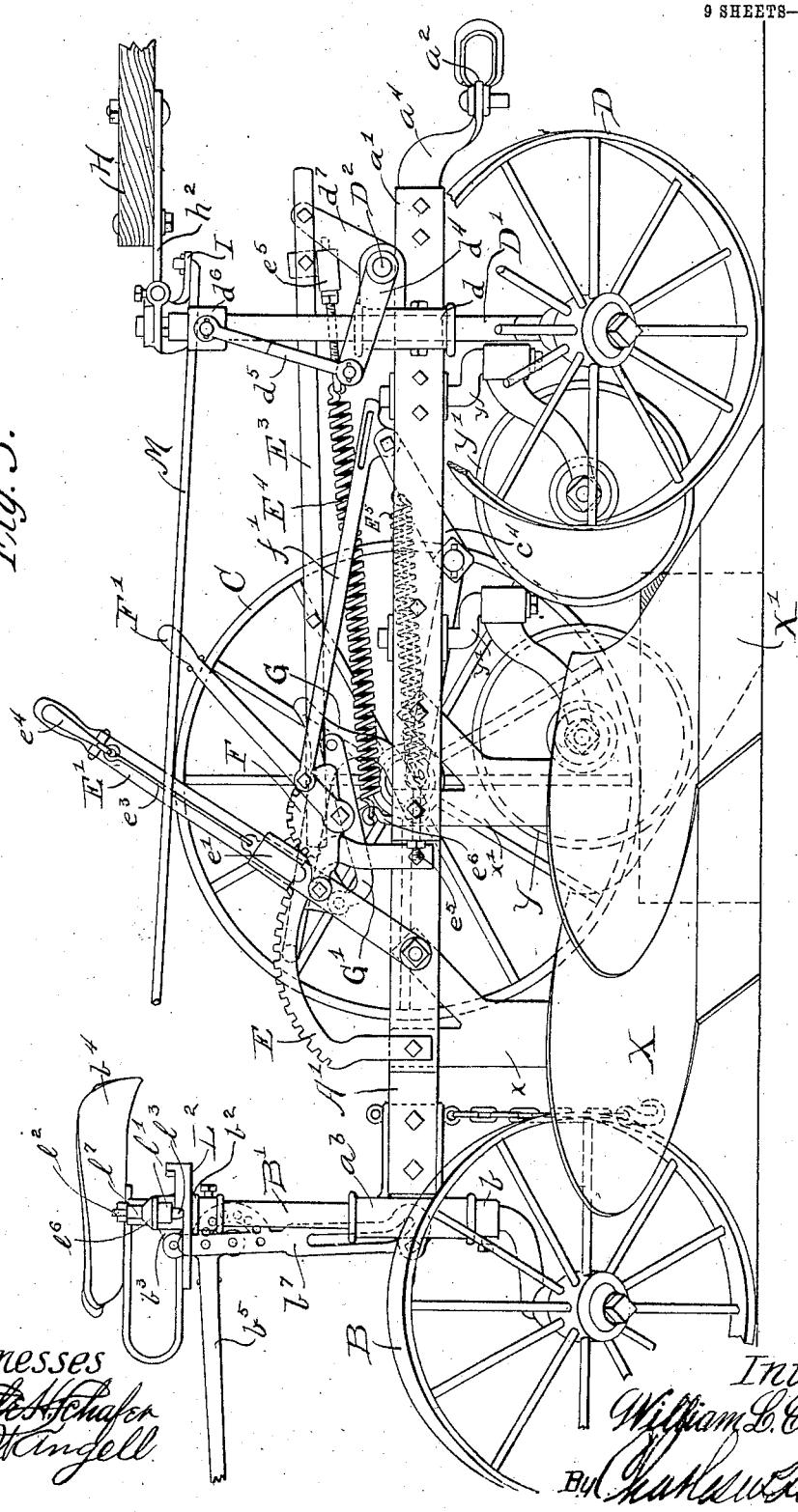
Figure 6:
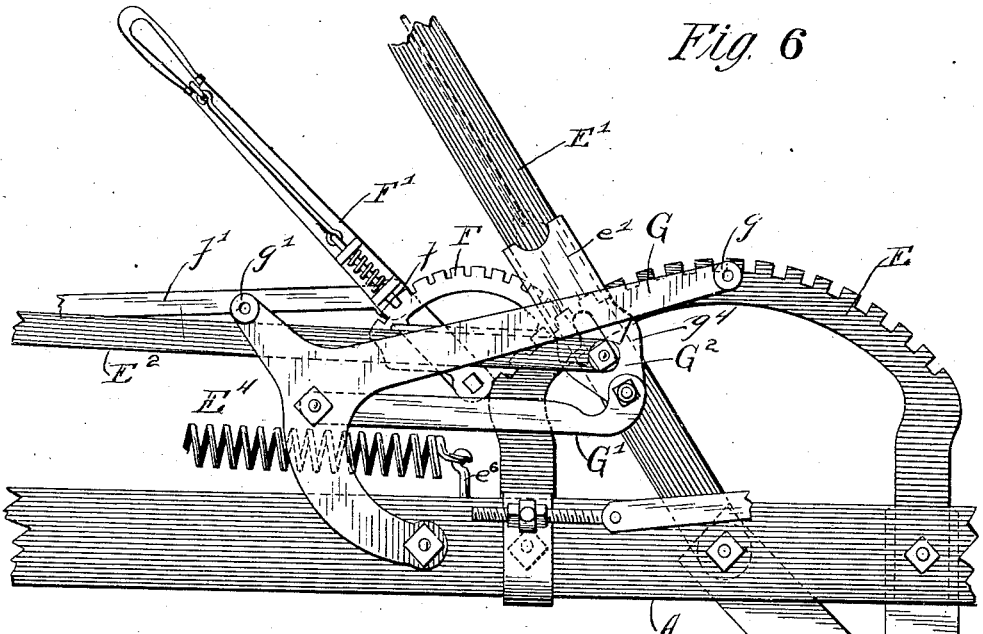
Figure 7:
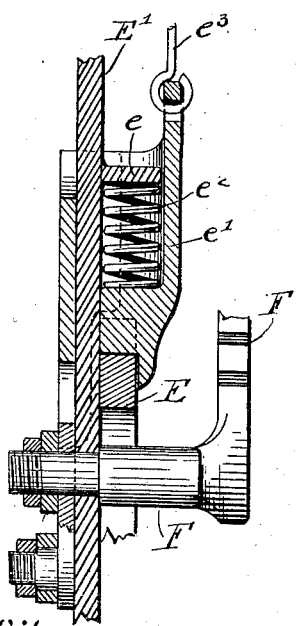
Figure 8:
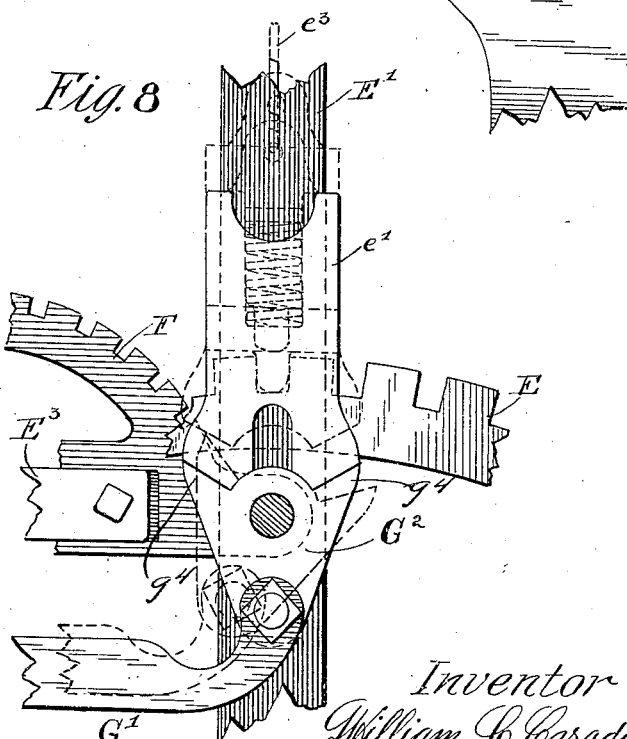
Figure 15:
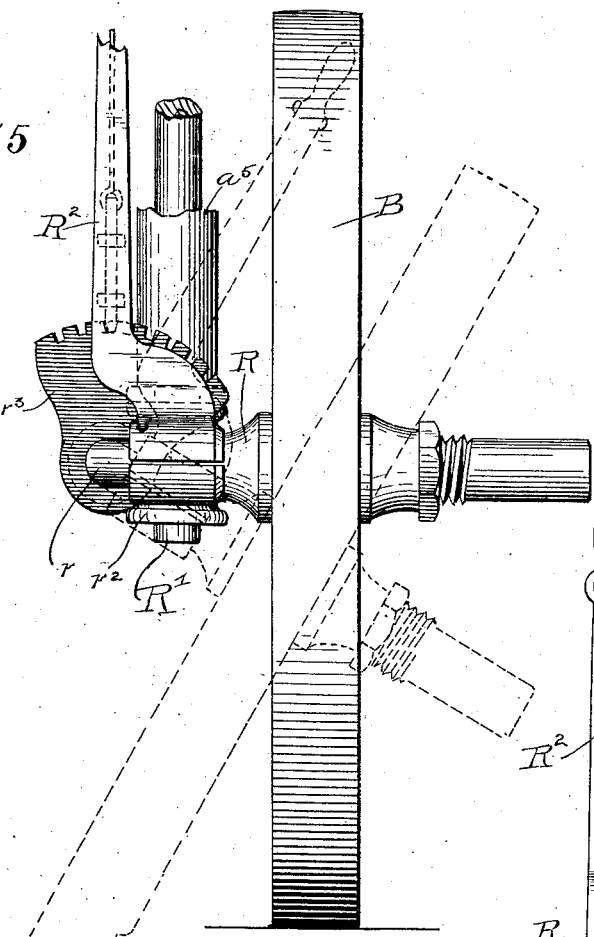
Figure 17:
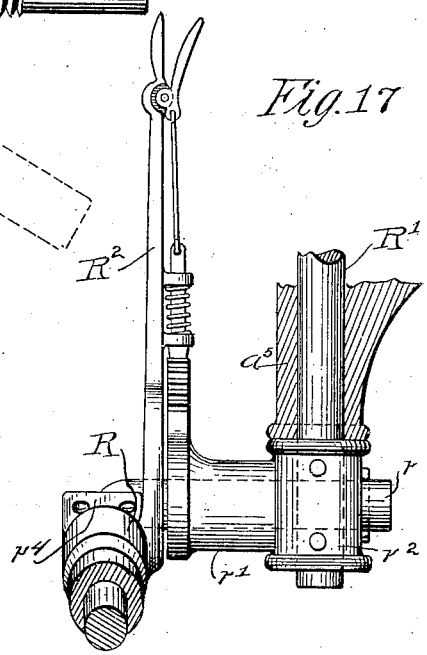
Figure 16:
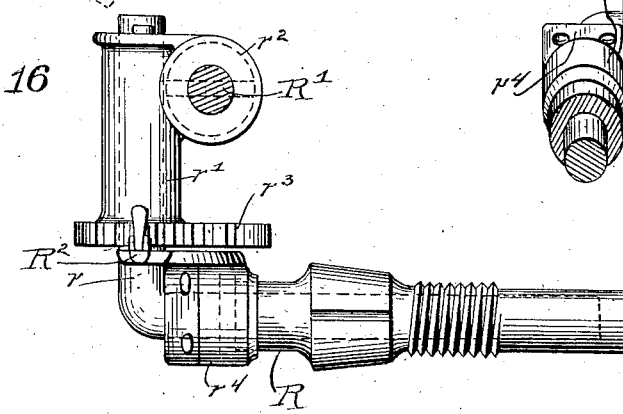

In the drawings, Figure 1 is a top plan view of a gang-plow embodying my invention. Fig. 2 is a side elevation of the same with the plows elevated. Fig. 3 is a similar view with the plows down. Fig. 4 is a rear elevation of the same. Fig. 5 is an enlarged detail of the adjusting mechanism supported on the rear axle. Fig. 6 is an enlarged fragmentary detail of the operating-levers carried on the beam, illustrating the position of said levers when the plows are down. Fig. 7 is a transverse section taken through the same. Fig. 8 is an enlarged fragmentary detail of the release mechanism for the operating-levers. Fig. 9 is an enlarged fragmentary detail of the mechanism for cramping the rear wheel. Fig. 10 is a similar view of the connections for cramping the front wheel. Fig. 11 is an enlarged section taken on line 11 11 of Fig. 9. Fig. 12 is an enlarged fragmentary detail of the rear end of the machine, illustrating one means for simultaneously cramping the wheels. Fig. 13 is a fragmentary side elevation of the same. Fig. 14 is a view similar to Fig. 11, illustrating the lifting of the detent, whereby the front or guide wheel is held in adjusted relation with the rear wheel. Fig. 15 is an enlarged detail illustrating means for adjusting the rear wheel to vary the angle or inclination thereof and omitted from Figs. 1, 2, 3, and 4 for clearness of illustration, said figures showing an ordinary bent axle and standard. Fig. 16 is a top plan view of the same with the wheel removed. Fig. 17 is a fragmentary side elevation of the same with the wheel omitted. Fig. 18 is a fragmentary top plan view of the front end of the machine, showing the tongue attached on the side opposite from that shown in Fig. 1. Fig. 19 is a fragmentary front elevation of the same with parts omitted. Fig. 20 is an enlarged detail, in vertical section, of the tongue-carrying bracket illustrated in Figs. 18 and 19. Fig. 21 is a detail view of the parts of the mechanism shown in Fig. 20, taken at a right angle with said view. Fig. 22 is a fragmentary top plan view of the construction shown in Fig. 12. Fig. 23 is an enlarged fragmentary section taken on line 23 23 of Fig. 13.

As shown in said drawings, the plows (indicated by X and X') are rigidly secured, by means of standards $x$ $x'$, upon a beam-frame comprising a main longitudinal beam constructed of straps or bars of metal A and A' or other suitable material extending longitudinally of the plow approximately its entire length and of which the strap or bar A' has rigidly secured on the outer side thereof the straps $a$ and $a'$, extending laterally from near the middle thereof to a sufficient distance to afford a support for the front plow X' and are bent forwardly and spaced a distance apart, as shown in Fig. 1, affording a beam for said front plow. The front ends of the beam afforded by the straps $a$ and $a'$ are rigidly bolted to a transverse clevis-bar $a^2$, having apertures arranged along its length adapted to receive a clevis-pin. Said clevis-bar is provided with rearwardly-directed integral arms $a^3$ and $a^4$, adapted to engage between and to be rigidly bolted to the straps forming said beams.

The straps A and A' at their rear ends are rigidly bolted to the forwardly-directed web of a vertical or bearing sleeve $a^5$, in which is rotatively engaged the vertically-extending upper end B' of the bent axle for the rear wheel B, which if the plow is intended to be used upon level ground only may be constructed of a single bar or shaft of metal bent to the desired form to afford the desired inclination of the wheel, as shown in Figs. 1 and 4, or if designed for operating on hillsides may be constructed to enable the plowman at will to vary the inclination of the wheel with respect to the frame, as shown in Figs. 15, 16, and 17. If constructed of a single shaft or bar of metal, an adjustable collar $b$ is secured on said axle above the bend therein, which limits the downward adjustment of the sleeve $a^5$, and consequently the beams and plows, and means are provided for adjusting said rear end of the beams vertically on said vertical standard or axle end B', comprising a collar $b^2$, adjustably secured at the upper end thereof. Said collar $b^2$ is provided with a rearwardly-directed arm $b^3$, and pivotally connected on said arm is a link $b^4$, provided with an operating-lever $b^5$ and a hand operating spring-detent $b^6$, as shown in Fig. 5, and which is connected at its lower end at the center of a segment $b^8$, integral with a link $b^7$. The lower end of said link $b^7$ is provided with an aperture and a longitudinal slot and is pivotally engaged to said sleeve $a^5$ by means of a bolt secured therein and extending through either the slot or the aperture at the lower end of said link, so that when said lever is thrown rearwardly, as shown in Fig. 3, said frame is permitted to move downwardly on said shaft B' to a distance dependent upon the adjustment of the toggle formed by the links and which can of course be regulated by the adjustment of said detent in the segment $b^8$. When said lever is thrown forwardly, as shown in Fig. 2, said toggle-bars act to swing the rear ends of the frame upwardly to the position shown in Fig. 2, thereby elevating the plows. The front end of said frame is adjustably supported upon the wheels C and D, of which the wheel C is on the landside of the plow and is journaled on a bent axle $c$, journaled in a suitable bearing C', rigidly engaged upon the side of the main beam by means of braces $c^2$ and $c^3$, to which the bearing of any desired kind is rigidly bolted. The inner end of said axle $c$ extends beyond said main beam and is provided with a crank-arm $c^4$, whereby the axle can be rotated to elevate that side of the frame by mechanism hereinafter described. The front wheel D is journaled upon a bent axle of the usual or any desired form D', which extends upwardly and is rotatively as well as slidably engaged in a bearing-sleeve $d$, which, as shown, is constructed of cast metal and provided with a laterally-extending web which is rigidly bolted between the laterally-directed bars $d'$ and $d^2$, bolted to the outer side of the bar $a'$ of the beam for the front plow, as shown in Figs. 1 and 4. Journaled on the front end of the beams and at a right angle with the draft of the plow is a rock-shaft $D^2$, provided at its end adjacent said wheel D with an arm $d^4$, the outer end of which is pivotally connected by a connecting-rod $d^5$ with a collar $d^6$, rigidly secured at the upper end of the axle D', so that rotation of the shaft $D^2$ in one direction elevates the frame on said axle, while rotation in the opposite direction permits the frame, with its plows, to extend into working position. Secured on the inner end of said rock-shaft $D^2$ adjacent to the main beam is a lever-arm $d^7$. Rigidly bolted upon the bar A' on the main beam in advance of the rear axle B' is a segment E, adapted to control the position of a lever E', whereby the beams and plows are elevated. Said lever comprises a metallic or other suitable bar pivoted on said beam above the rear plow and extending past said segment in operative relation therewith. Said lever is provided in operative relation with the segment with a casing $e'$, shaped at its lower end on the side adjacent the segment to afford a detent therefor and within which and integral with the lever is a projection $e$, against which bears a spring $e^2$, which acts to hold said detent at all times in engagement unless released. A rod $e^3$ extends upwardly along said lever and is provided at the upper end with a levered handle $e^4$, adapted to be manually engaged to release the detent and which permits the lever to be adjusted upon the segment. A rod $E^2$ connects said lever E' below the detent and the lever-arm $d^7$ on the end of said rock-shaft $D^2$ and affords means for operating the same. As shown, a toothed segment F is pivotally secured on said lever E' on the opposite side thereof from said connecting-rod $E^2$ and extends forwardly, and a bar or connecting-rod $E^3$, also secured on the lever-arm $d^7$ of the rock-shaft, is bolted to said segment F, as shown in Figs. 1 and 8. A hand-lever F' is pivoted at the center of said segment F and is provided with a spring-detent $f$, adapted to engage the segment. Connected with said lever F' at a point opposite the detent is a connecting-rod $f'$, which extends forwardly and engages the lever-arm $c^4$ on the inner end of the axle-shaft $c$. Between the connecting-rods $E^2$ and $E^3$ and connected with a threaded eyebolt engaged in a block $e^5$, bolted to and between said connecting-rods, is a strong pulling-spring $E^4$, the rear end of which is engaged upon an eyebolt or hook $e^6$, secured in the frame, as shown in Figs. 1 and 3. Attached to the lever-arm $c^4$ is a corresponding spring E⁵, the rear end of which is likewise secured to a threaded eyebolt or hook $e^7$, the threaded end of which extends through the transversely-directed ends of the bars $a\ a'$ and is provided on its outer end with a nut whereby the tension of the spring can be adjusted. Said springs are of sufficient strength to normally support approximately the weight of the beams and plows, so that the plowman on releasing the lever E' or F' and pulling the same rearwardly is assisted by the tension of said springs in lifting the plows.

As shown, a foot-lever G is pivotally engaged on the main beam and enables the plows to be lifted without releasing said levers manually. Said foot-lever G is pivoted on the main beam in advance of the segment E and is provided with a rearwardly-extending relatively long power-arm provided with a foot-piece $g$, adapted to be engaged by the plowman, and with a shorter power-arm directed at approximately right angle therewith and provided with a foot-piece $g'$ in a similar manner. Pivotally connected between the power and fulcrum ends of said foot-lever is a connecting-rod G', which, at its other end is pivotally engaged with a cam-plate G², pivoted on the lever E', by means of the bolt or other connection, whereby the segment F and connecting-rod E² are connected therewith. Said cam-plate is shaped at its upper end to provide laterally-directed projections $g^4$, which engage the lower end of the casing $e'$, carrying the detent for said lever E'. Movement of said connecting-rod G' by means of said lever G therefore acts to force the detent upwardly out of engagement with the segment, as shown in Fig. 8, and permits the lever E' to swing rearwardly, carrying the segment F and lever F' and aided by the tension of the respective springs raises the beam and plows.

Means are provided for simultaneously cramping the rear wheel B and furrow-wheel D in turning adapted to be operated by the draft-tongue H when such is used, or, if a tongueless plow, adapted to be operated by lever P', carried on the seat-bracket, as shown in Figs. 12 and 13. For this purpose the upper end of the standard formed by the upper end of the front axle D' is angular, and secured thereon is an inwardly, downwardly, and forwardly directed lever I, which is provided at one end with an aperture complemental with and fitted to the end of said axle or standard and is secured in place by a nut and jam-nut $i\ i'$, as shown in Fig. 10. A horizontally-apertured boss $i^2$ is provided on the socketed end of said lever, in which is secured a stud-shaft $h$, which extends horizontally inward, as shown in Fig. 4, and is adjustably secured at its outer extremity in said boss $i^2$ by means of a set-screw. Said tongue H is provided on its rear end with a metallic or other suitable rearwardly-directed yoke $h^2$, the arms of which are apertured at their extremity to engage on said stud-shaft $h$, and between which, when so engaged on said shaft, is engaged a sleeve $h^3$, as shown in Fig. 10, provided with a set-screw $h^4$, adapted to secure said tongue at any desired point in the length of said shaft.

Secured on the upper end of the rear standard formed by the upper end of the rear axle B' and resting upon a sleeve $b^2$, rigidly secured on said standard, is a seat-bracket K, in which said standard is free to rotate. Said bracket is provided with a laterally-extending arm $k$, which is rigidly connected with the main frame by means of a rod $k'$, which extends through said brackets and at its lower end engages an eyebolt $k^2$, which has threaded engagement in a foot-rest $k^3$, comprising a laterally-extending bar rigidly bolted to said beam in position to support the feet of the operator. Carried on said bracket is the spring-seat K' of the usual form, which is secured on the outer end of the arm $k$. Rigidly secured on the upper end of said standard B', which is angular at its extremity for that purpose, as shown in Fig. 9, is a lever L, which extends laterally and oppositely from the arm $k$ and from the lever I on the front standard D' and is provided in its outer end with a head $l'$, through which extends a vertical stem $l^2$, the lower end of which is enlarged and shaped to afford a latch-bolt $l^3$, which is seated in a bore in said head $l'$, as shown in Fig. 11, and which is held normally extended below the head $l'$ by means of a spring $l^4$. Said stem $l^2$ extends above the head $l'$ and is provided with a transverse cotter-pin $l^5$ or other suitable means, which limits the downward movement of the bolt. The upper end of the head $l'$ affords a conical cam-surface $l^6$, which extends upwardly to a cylindric extension $l^7$, on which fits a washer $l^8$, through which said stem passes. Beneath and in operative relation with said bolt on said lever L and rigidly secured to the head K of the seat-bracket is a horizontally-directed segment L², the upper surface of which inclines rearwardly and is provided with notches or steps $l^9$ and $l^{10}$, and at the rear of the latter is provided an aperture in which said bolt engages when the wheels are directed straight with the furrows.

Connected in the free extremity of the lever I on the front axle is a rearwardly-extending bar or rod M, provided with a relatively long thread at its rear end, which engages in the forwardly-directed end of a link M', the rear end of which is longitudinally slotted to receive the cylindric extension $l^7$ on the head $l'$ and to slide thereon. Said link at the middle part of said slot is of a thickness corresponding with the height of said cylindric extension $l^7$, and on its under side near each end of said slot is inclined downwardly and outwardly to afford a cam-surface for engagement with said conical surface of said head, as shown in Fig. 11, so that movement of said bar in either direction is sufficient to bring said cylindric extension $l^7$ into the end of the slot and acts to lift the bolt, thereby adjusting the rear wheel to correspond with the front wheel D in turning. As shown, an upwardly and rearwardly directed extension $l^{12}$, integral with said link, extends from a point in advance of the slot in said link rearwardly into position to engage the stem of the bolt at about the middle of the slot and to push the same rearwardly to return the bolt to locking position after it has been moved forwardly in cramping.

Obviously the tongue H can be secured on either side the beams. If secured on the side thereof opposite from the wheel D, a bracket N is rigidly bolted or otherwise secured at the front end of the main beam, provided with an upwardly and laterally directed head $n$, having a vertical bore therein adapted to receive a cylindric pin or shaft N', on the upper end of which is a transversely-apertured sleeve $n'$ to receive the shaft $h$. Said pin N' is provided on its front side with a lever $n^2$, and corresponding lever $n^3$ is secured integrally on the boss $i^2$ of the lever I. The extremities of said levers $n^2$ and $n^3$ are adjustably connected by means of a rod $N^3$, having a turnbuckle $n^4$ therein adapted to adjust the same as to length.

Should it be desired to operate the plow as a tongueless plow, a tooth-segment P is rigidly bolted beneath the segment $L^2$ by means of a horizontally-extended bracket $p$, as shown in Fig. 12, and a lever P' is pivoted thereon and provided with a spring-detent $p'$, which acts to hold said lever in adjusted position. A rod S is pivoted at one end to the lever P' and extends forwardly, and the other end thereof is loosely pivoted to a collar $s$, rigidly engaged upon the rod M, thereby forming a rigid connection between the front and rear axles and said lever, by means of which the wheels may be cramped and held in adjusted position.

As further improvements I have provided means for varying the angle of inclination of the rear wheel. This is particularly useful in plowing hillsides, because when turning a furrow downhill the incline of the hill increases the incline of the wheel so much that the bottoms are drawn downhill and out of land. By straightening up this hind wheel the bottoms are drawn into land and run in proper line, turning the furrow perfectly. In a similar manner the inclination of said wheel is varied in turning the furrow uphill, as in such cases the wheel needs more inclination than on the level. To avoid complicating the drawings, this part of my invention is not shown on Figs. 1, 2, 3, and 4, but is shown in the enlarged details in Figs. 15, 16, and 17, in which, as shown, the axle $r$ for the rear wheel B is bent at a right angle, and the rear end thereof extends horizontally through a sleeve $r'$, integrally connected at right angles with a sleeve $r^2$, which receives and is rigidly secured to the lower end of the vertical-standard shaft R', upon which the rear sleeve $a^5$ of the beams slide, as before described, and which in all respects corresponds with the upper or vertical end of the axle B'. A tooth-segment $r^3$ is integrally secured on the sleeve $r'$ adjacent the axle, and, as shown, a lever $R^2$, provided with a spring-detent to engage said segment, is rigidly secured on the axle $r$ by means of a split clamping-band $r^4$, adapted to be bolted or otherwise rigidly secured in place. This arrangement enables the plowman by means of the lever $R^2$ to shift the rear wheel either to a vertical position, as shown in Fig. 15, or to any desired angle of adjustment from the vertical, as shown in dotted lines in Fig. 15. Said wheel may be journaled on its axle in any desired manner. As shown, however, a sleeve R is rigidly secured on said axle $r$ and a conical bearing is provided thereon adapted to fit into the complementally-apertured hub of said wheel, and the end of said sleeve is threaded to engage a nut which bears against the outer end of the wheel-hub.

The operation is as follows: The driver, either riding or walking behind or beside the plow, lowers the beams with the plows and colters Y Y' thereon by throwing the lever E' forwardly. The weight of the beams and the plow-colters brings the same down into operative position, and the tension of the springs $E^4$ and $E^5$ is sufficient to approximately balance the weight thereof. As the plowing proceeds should the ground be stony or other obstructions occur in the path of the plows the slot in the link $b^7$, should the bolt connecting the sleeve $a^5$ therewith be secured therein, permits the rear end of the frame to rise, permitting the plows to pass over the obstruction without affecting the plowman, whose weight is supported on the upper end of the standard axle or shaft B'. Should the ground be free from stones or other obstructions, the plows can be locked down by securing the link $b^7$ to the sleeve $a^5$ through the aperture in said link. The frame and plows are raised by releasing the lever E' either manually or by means of the foot-lever, whereupon the springs aid in elevating the beams and plows. In turning, the tongue H being used, the cramping of the front wheel D thereby actuates the rod or bar M, producing corresponding movement of the rear wheel B, thus enabling the plow to be turned much more quickly than would otherwise be the case. Should the plow be tongueless, the operator cramps the front wheel by cramping the rear wheel by means of the lever $R^2$.

For hillside plowing the rear wheel can be adjusted by the plowman while the plow is in operation to any desired angle with the ground, thus enabling the plow at all times to be held to land whether throwing the furrow downhill or uphill. Should no tongue be used, a draft-animal may be hitched directly to the clevis-bars $a^2$, and in that event it is at times desirable to use the rear wheel as a brake or drag to prevent the plow from running on the heels of the horses when the plows are elevated. For this purpose a chain S is secured upon the main beam, near the rear end thereof, positioned to engage around the rim or one of the spokes of the wheel B, holding the same from rotation. Obviously by means of the apertured segment carried on the link $b^7$, which elevates the rear end of the beams and the lever for operating the same, the rear end of the beams can readily be adjusted to any desired height, as can also the front end, by means of the segments E and F and levers E' and F', thus regulating the depth of the furrow.

Obviously I have described but one of several constructions of embodying my invention, and I do not desire to be limited to the specific details of construction and operation herein described other than necessitated by the prior art and as stated in the claims, as obviously many details of construction may be varied without departing from the principles of this invention.

I claim as my invention—

1. In a wheeled plow a main beam, a plow rigidly secured thereon, a laterally-disposed wheel supporting said beam, a rear inclined wheel, an axle therefor, an upright standard connected with said axle, and on which the beam is adapted to slide, a seat carried on the upper end of said standard, a lever and a segment adapted to adjust said beam as to height and means for connecting said beam with the segment to permit the plow to pass over obstructions with operating the lever.

2. In a wheeled plow the combination with the supporting-wheels of a beam adjustably supported thereon, means acting to adjust said beam as to height on the front wheel, elevating means on the rear axle, a link connected therewith at one end and adapted at the other end for either pivotal or slidable connection with the beam.

3. In a wheeled plow, the combination with a land-wheel of an axle therefor bent to afford a crank, a plow-beam to which the crank is journaled, an inclined furrow-wheel journaled at the side of the beam, a standard connected with the axle thereof, and on which said beam is slidably secured, a rear inclined wheel also provided with a standard, operative connection engaged on the rear end of the beam and on said standard for the rear wheel adapted to elevate the beam thereon, a rod or bar connecting the upper ends of said standards and acting to produce corresponding movement in each in cramping the wheels and means thereon adapted to automatically release the rear standard.

4. A wheeled plow comprising a land-wheel, and front and rear inclined furrow-wheels, a vertical standard connected with the axle of each inclined wheel, a plow-beam slidably secured on said standards, a lever at the upper end of each standard, a connecting-rod between said levers and acting to correspondingly adjust said wheels in turning, a lock for said rear standard, automatic means for releasing the same and means admitting of varying the angle of inclination of the rear wheel.

5. A gang-plow comprising a main and a side beam rigidly connected together, a plow rigidly secured in each, a colter secured to each beam in advance of each plow, a land-wheel and front and rear inclined furrow-wheels on which the plow is supported, an upright standard connected with the axle of each furrow-wheel and on which said beams are slidably engaged, a rock-shaft journaled on the front end of said beams, a hand and a foot lever connected therewith acting to elevate said beams, plows and colters, a seat rigidly secured on one of said standards and means connected therewith acting to hold the rear end of the beam in an adjusted position.

6. In a wheeled plow, the combination with the beams of plows rigidly secured thereto, a colter in advance of each plow, a land-wheel and front and rear inclined furrow-wheels, an upright standard connected with the axle of each furrow-wheel and rotatively journaled at the ends of the beams on which said beams are adapted to slide upwardly, independently and simultaneously operated means for adjusting the front ends of the beams vertically, means for adjusting the height of the rear ends of the beams, means for locking the rear standard from rotation, an automatically-operative connection between said front and rear standards of the furrow-wheels whereby the cramping of one wheel acts to release the lock and cramp the other in turning, and means adapted to adjust the angle of inclination of the rear caster-wheel.

7. In a wheeled plow, the combination with a beam of a land-wheel, a bent axle therefor journaled to said beam, front and rear inclined furrow-wheels each having a bent axle affording in part an upright standard and slidably journaled on said beam, a tooth-segment rigidly secured on the beam, combined foot and hand operating levers therefor, a movable segment secured on the hand-lever, a lever therefor, connecting-rods engaged on said levers and operatively connected with said beam and one of the axles and acting to elevate the front end of the frame by simultaneous movement of said levers and springs engaged on said beams, and operating mechanism acting to lift the beams.

8. In a wheeled plow means for locking the rear wheel from lateral movement, operative connections between the front and rear wheels, and a cam thereon adapted to lift said lock when the front wheel is turned.

9. In a wheeled plow, the combination with a front and rear furrow-wheel of an upright or standard connected with each axle, a lever carried on each standard, a connecting-rod pivotally engaging and connecting said levers whereby cramping of one wheel produces corresponding movement in the other, a segment adjacent said rear standard, a vertically-movable detent adapted to engage the same and hold said levers in position for the wheels to track straight ahead and means on said rods acting to raise said detents and release the standards in turning.

10. In a wheeled plow, a vertically-adjustable beam, plows rigidly secured thereon, wheels supporting the said beam by means affording vertical adjustment of the same, a laterally-extending bracket journaled on one of said wheels, brace-rods connecting the same with said beam and a seat carried on said bracket and adapted to be unaffected by the elevation of the beams.

11. In a wheel-plow a furrow-wheel at each end of the beam, a lever carried by each, a connecting-rod joining said levers, a segment and a detent at the rear end of said connecting-rod and a slotted link in said rod provided with an inclined under surface adapted to slidingly engage said detent and elevate the same in cramping the wheel.

12. In wheeled plows having a front and a rear furrow-wheel, a connecting-rod eccentrically connecting the axles of the furrow-wheels, a detent at the rear furrow-wheel acting to hold the wheels at straight-ahead position and automatically-operated means at said rear furrow-wheel for releasing said detent.

13. In a wheeled plow, front and rear furrow-wheels, a lever operatively connected with each, a connecting-rod pivotally connected with one of said levers and slidably connected with the other, a detent holding said latter lever and adapted to be released by movement of the connecting-rod whereby said wheels have a slight independent movement but cramp simultaneously.

14. In a wheeled plow, a front and a rear furrow-wheel, a lever rigidly secured on each, a detent rigidly engaging the lever for the rear wheel and holding the same straight, a connecting-rod at one end positively engaging the front lever and at its other end slidably engaging the rear lever and admitting of slight movement of the front independently of the rear wheel and a cam operated by the connecting-rod acting to release the detent in cramping.

15. In a wheel-plow, the combination with the front and rear furrow-wheels, of a connecting-rod operated by the front furrow in cramping and a sliding cam thereon acting to automatically release and cramp the rear furrow-wheel with the front wheel.

16. In a wheeled plow the combination with the front and rear furrow-wheels provided with upwardly-directed standards of a land-wheel, a frame slidably engaged on said standards, a transverse shaft journaled on the front end of said frame, a toggle-lever engaged on said shaft and on the upper end of the front standard; a lever pivoted near the rear end of said frame, means for locking said lever in position, a notched segment pivoted on said lever, an arm on said shaft, rods engaged thereon and engaged one on said lever and one on said segment, a lever pivoted on said segment, a bent axle on said land-wheel, an arm on the inner end thereof, a rod connecting said last-named lever with said arm, plows carried on said frame and springs engaged on the frame and said rods acting to assist in elevating the frame.

17. In a device of the class described the combination with a land-wheel, of a front and a rear furrow-wheel, a beam adjustably engaged on said wheels, a rock-shaft on the front end of said beam, a lever pivoted on the beam, means adapted to hold said lever in adjusted position, a bar connecting said lever with the rock-shaft, a coiled spring engaged at one end to said bar and at the other end to said beam and acting normally to elevate the beam, plows on said beam and means connecting the front and rear furrow-wheels and adapted to simultaneously cramp the same.

18. In a device of the class described the combination with a beam, of a land-wheel therefor, a bent axle on said land-wheel and journaled on the beam, a front and a rear furrow-wheel, standards thereon means slidably connecting said beam on said standards, a rock-shaft on the front end of said beam, a lever pivoted on the beam, a rod connecting said lever with the rock-shaft, a coiled spring engaged at one end on said rod and at the other end on said beam, a coiled spring engaged at one end on the axle of the land-wheel and at the other on said beam, adjustable means adapted to rotate the axle in adjusting the beam and means for simultaneously cramping the furrow-wheels.

In testimony whereof I have hereunto subscribed my name in the presence of two subscribing witnesses.

WILLIAM L. CASADAY.

Witnesses:
HARVEY H. GINZ,
MERRITT C. BEALE.